United States Patent
Lang et al.

(10) Patent No.: US 7,263,778 B2
(45) Date of Patent: Sep. 4, 2007

(54) HIGH CONTRAST SPIRIT-LEVEL VIAL

(75) Inventors: Joel Lang, Giva'ataim (IL); Assif Stoffman, Kfar-Yona (IL)

(73) Assignee: Coloured Level Ltd., Kfar-Yona (IL)

( * ) Notice: Subject to any disclaimer, the term of this patent is extended or adjusted under 35 U.S.C. 154(b) by 0 days.

(21) Appl. No.: 10/534,496

(22) PCT Filed: Oct. 6, 2003

(86) PCT No.: PCT/IB03/04391

§ 371 (c)(1),
(2), (4) Date: Sep. 27, 2005

(87) PCT Pub. No.: WO2004/044524

PCT Pub. Date: May 27, 2004

(65) Prior Publication Data

US 2006/0117586 A1    Jun. 8, 2006

Related U.S. Application Data

(60) Provisional application No. 60/495,137, filed on Aug. 15, 2003, provisional application No. 60/425,297, filed on Nov. 12, 2002.

(51) Int. Cl.
*G01C 9/02* (2006.01)
*G01C 9/18* (2006.01)

(52) U.S. Cl. .................................................. 33/379
(58) Field of Classification Search .................. 33/379
See application file for complete search history.

(56) References Cited

U.S. PATENT DOCUMENTS

| | | | | | |
|---|---|---|---|---|---|
| 771,803 | A | * | 10/1904 | Bishop | 33/379 |
| 1,309,752 | A | * | 7/1919 | Bossler | 33/379 |
| 1,563,321 | A | * | 12/1925 | Bedortha | 33/348 |
| 1,730,109 | A | * | 10/1929 | Bacon | 33/377 |
| 2,646,628 | A | * | 7/1953 | Shaler | 33/379 |
| 3,673,697 | A | * | 7/1972 | Wasson | 33/348 |
| 4,164,077 | A | * | 8/1979 | Thomas | 33/348 |
| 4,407,075 | A | * | 10/1983 | MacDermott et al. | 33/348.2 |
| 4,647,767 | A | * | 3/1987 | Jubinski | 33/379 |
| RE32,570 | E | | 1/1988 | Conn | 33/365 |
| 5,272,816 | A | | 12/1993 | Fujiwara | 33/379 |
| 5,403,001 | A | | 4/1995 | Skorpinski | 33/379 |
| 6,386,994 | B1 | | 5/2002 | H'Doubler et al. | 33/379 |
| 2002/0124425 | A1 | * | 9/2002 | Szumer | 33/365 |

* cited by examiner

Primary Examiner—Christopher W Fulton
(74) Attorney, Agent, or Firm—Nixon & Vanderhye P.C.

(57) ABSTRACT

A spirit-level vial comprising a transparent vessel containing a globule of a first liquid suspended in a medium comprising a second liquid, wherein said transparent vessel is essentially completely filled by said medium, and wherein said globule is capable of moving freely through said medium in response to changes in the spatial orientation of said transparent vessel.

15 Claims, 1 Drawing Sheet

HIGH CONTRAST SPIRIT-LEVEL VIAL

This application is the US national phase of international application PCT/IB2003/004391 filed 6 Oct. 2003 which designated the U.S. and claims benefit of U.S. Provisional Application 60/425,297, filed 12 Nov. 2002; U.S. Utility Application 10/354,167, filed 30 Jan. 2003, now Abandoned; and U.S. Provisional Application 60/495,137, filed 15 Aug. 2003, the entire contents of each of which are hereby incorporated by reference.

FIELD OF THE INVENTION

The present invention relates to a device for use in determining whether surfaces are level. More specifically, the present invention relates to a spirit-level vial containing a liquid drop or globule suspended within a second liquid medium.

BACKGROUND OF THE INVENTION

The use of spirit-levels (also sometimes known as bubble levels) and other related leveling devices (such as clinometers) in a variety of engineering and domestic settings is well known in the art. In its most usual form, the spirit-level consists of a rigid-walled, transparent vial or capsule partially filled with a liquid, into which is entrapped a bubble. By means of suitable markings placed either on the capsule itself or on a base member supporting said capsule, the user is able to determine when the device is placed in a level orientation in relation to a desired plane. This simple spirit-level design has changed little over the years and is generally recognized as having the advantages of simplicity of construction and reasonable accuracy.

One significant drawback of the basic spirit-level design, however, is the difficulty commonly encountered in reading the device. This difficulty is essentially one of insufficient contrast or visual differentiation between the liquid contained in the vial and the bubble entrapped therein. This problem is further exacerbated by the poor lighting conditions that prevail in many of the working environments in which spirit-levels are used.

Many attempts have been made over the years to overcome the problem of poor visibility or readability of spirit-levels. The attempted improvements made to the basis design include the addition of one or more of the following structural features: a reflective surface beneath the fluid-containing vial, a color-contrasting background, fluorescent liquids within the vial, externally placed viewing prisms (in order to accentuate the differences in refractive index of the liquid and the bubble) and illumination of the vial. These various prior art attempts are reviewed in U.S. Pat. Nos. 4,164,077 and 4,407,075.

It may be readily appreciated from the foregoing partial list of prior art approaches that all of the previous attempts to increase the contrast between the liquid within the vial and the bubble suspended therein have focused either on changing the visual properties of the liquid (either directly, or by the use of contrasting backgrounds) or on increasing the overall illumination levels. While some of the abovementioned prior art approaches have led to partial improvements in readability, a need still exists for a spirit-level vial having substantially increased contrast between the liquid and the suspended bubble.

The aim of the present invention, which will shortly be disclosed and described hereinbelow, is to provide a spirit-level vial having significantly improved readability.

A further aim of the present invention is to provide an improved spirit-level vial in which the increased visual contrast between the vial liquid and the bubble suspended therein is obtained by altering the structure and properties of said bubble.

It is a still further purpose of the invention to provide a spirit-level vial that overcomes the disadvantages of prior art vials.

Further objects and advantages of the present invention will become apparent as the description proceeds.

SUMMARY OF THE INVENTION

It has now been unexpectedly found that it is possible to manufacture a spirit-level vial having significantly improved readability in which the air bubble of the conventional type of spirit-level is replaced by a drop or globule of a first liquid that is suspended within a second liquid medium that fills said vial. By careful selection of the type and color of the liquid used to form the drop or globule and of the liquid medium, it is possible to obtain very high visual contrast between these two components.

The present invention is primarily directed to a spirit-level vial comprising a transparent vessel containing a globule of a first liquid suspended in a medium comprising a second liquid, wherein said transparent vessel is essentially completely filled by said medium, and wherein said globule is capable of moving freely through said medium in response to changes in the spatial orientation of said transparent vessel.

Although the term "globule" is conventionally understood to refer to a small spherical figure such as a small ball, orb or globe, for the purposes of the present invention, the globule that is suspended within the second liquid medium may also be present in other, related, geometrical forms that are not perfectly spherical, such as an oblate sphere, an elongated sphere or a tear-drop shape. The term is also used in its present context to indicate that the volume of said "globule" is very small in relation to the volume of the second liquid medium, in which said globule is suspended.

The phrase "a globule of a first liquid suspended in a medium comprising a second liquid" is to be understood in the sense that the mutual immiscibility of the two liquids is such that the globule constitutes a distinct phase within the second liquid, there being no substantial change in the volume, mass or shape of said globule over a time frame corresponding to the usual (or desired) working lifespan of the spirit-level vial disclosed herein.

According to a particularly preferred embodiment of the present invention, the first solvent constituting the gloubule and the second solvent constituting the medium have distinctly different densities, which densities are designated $\rho_1$ and $\rho_2$, respectively, such that either $\rho_1$ is greater than $\rho_2$, or $\rho_2$ is greater than $\rho_1$. Preferably, $|\rho_1-\rho_2| \geq 0.1$ g/cc, and more preferably, $|\rho_1-\rho_2| \geq 0.3$ g/cc.

The transparent vessel of the present invention may be constructed of any suitable material of sufficient transparency or translucency that is compatible with the first and second liquids that are to be contained therewithin, as will be discussed at greater length hereinbelow. It is to be noted that the term "transparent" in this context is to be understood as including within its scope both fully transparent vessels, as well as translucent vessels, whose degree of transparency is sufficient to permit convenient use of the spirit-level vial of the invention. Said transparent vessel may also be formed into any convenient shape that is compatible with the intended function of the spirit-level vial, including tube-like, hemispherical, capsular, and the like. Most preferably, the transparent material is selected such that the first liquid constituting the globule, when brought into contact with said transparent material, is repelled therefrom, that is, said first liquid is not attracted by said transparent material, thus allowing the preservation of said first liquid in its globular form. Particularly preferred materials having this property are polypropylene or its derivative, polymethylpentene. Alternatively, the transparent vessel is made of optically clear polycarbonate or glass, wherein the internal walls of the vessel may be appropriately coated, if desired, for example, with a thin layer of teflon (or fluor-based polymer).

The first and second liquids used to manufacture the spirit-level of the present invention may be any suitable liquids or mixtures of liquids that possess the physical properties described hereinabove.

As used hereinafter, the term "aqueous liquid" refers to a liquid which is either water alone or water to which has been added one or more water-miscible liquids and/or into which has been dissolved one or more water-soluble solutes.

As used hereinafter, the term "organic liquid" refers to any carbon-containing substance which is in the liquid state in the relevant temperature range, that is, in the range of temperatures in which the vessel according to the invention is intended for use, or to mixtures of such substances.

As used hereinafter, the term "inorganic liquid" refers to silicon oils or silicon fluids or ionic liquids.

According to the first preferred embodiment of the invention, there is provided a spirit-level vial comprising a transparent vessel containing a globule of a first liquid suspended in a medium comprising a second liquid, wherein the first liquid is an aqueous liquid and the second liquid is either an organic liquid or inorganic liquid, and wherein $\rho_2$ is greater than $\rho_1$. Preferably, $\rho_2$ is greater than 1.0 g/cc, and more preferably, $\rho_2$ is greater than 1.1 g/cc.

According to the first preferred embodiment of the invention, the aqueous liquid comprises a mixture of water and water-miscible lower alcohol ($C_1$-$C_4$ alcohol), which is preferably methanol or ethanol. More preferably, the aqueous liquid is mixture comprising (by weight) 80 to 90% water and 10 to 20% methanol.

It has been found that in the case wherein the first liquid constituting the globule is an aqueous liquid, then the second liquid, having a value of $\rho_2$ that is greater than 1.0 g/cc, and more preferably, greater than 1.1 g/cc, is preferably a halogenated aliphatic or alicyclic compound, or a mixture of such compounds. The term "halogenated" is used herein to refer to substances in which one or more halogen atoms are bonded to carbon atoms, wherein said halogen atoms are either fluorine, chlorine, bromine or iodine, or combinations thereof. Preferably, the organohalogen compound is selected from the group consisting of halogenated $C_1$-$C_{10}$ straight or branched alkanes, halogenated $C_3$-$C_{10}$ cycloalkanes, halogenated straight or branched $C_2$-$C_{10}$ alkenes, halogenated $C_3$-$C_{10}$ cycloalkenes, halogenated $C_2$-$C_{10}$ straight or branched alkynes or mixtures thereof. It should be noted that the term "halogenated $C_3$-$C_{10}$ cycloalkanes" encompasses also bicyclic compounds containing two fused rings. It has been found that particularly preferred organohalogen liquids are perfluorinated compounds, which have typical densities above 1.6 g/cc, such as those produced by 3M (Fluorinert™) or Flurochem Ltd (UK). It is to be noted that the abovementioned halogenated compounds that may be used in the present invention may be optionally further substituted with non-halogen substituents.

It should be understood, however, that non-halogenated organic liquids having densities greater than 1.0 g/cc (for example, polyphenyl ether liquids that are commercially available) may also be used as the medium liquid according to the first preferred ambodiment of the invention.

According to a second preferred embodiment of the invention, the first liquid is either an organic liquid or inorganic liquid and the second liquid is an aqueous liquid, wherein $\rho_1$ is less than 1.0 g/cc, and more preferably, $\rho_1$ is less than 0.9 g/cc.

It has been found that in the case wherein the first liquid constituting the globule is an organic liquid and the second liquid is an aqueous liquid, then the first liquid, wherein $\rho_1$ is less than 1.0 g/cc, and more preferably, $\rho_1$ is less than 0.9 g/cc, is preferably selected from the group consisting of $C_5$-$C_{18}$ straight or branched alkanes, $C_5$-$C_{10}$ cycloalkanes, straight or branched $C_5$-$C_{10}$ alkenes, $C_5$-$C_{10}$ cycloalkenes and $C_5$-$C_{10}$ straight or branched alkynes, or a mixture thereof. Aromatic hydrocarbons having suitable densities may also be used according to the this embodiment of the invention. According to a particularly preferred variant of the second preferred embodiment, the first liquid constituting the globule is an oil, or a mixture of oils.

According to a third preferred embodiment, both the first and second liquids are mutually immiscible organic liquids, wherein either $\rho_1$ is less than $\rho_2$, or vice versa.

Either one or both of the abovementioned first and second liquids may be strongly colored. In the event that only one of said liquids is strongly colored, the other may be essentially colorless. In the event that both of said liquids are strongly colored, each of said liquids is of a different, mutually-contrasting color. In one preferred embodiment of the invention, the first liquid is colored and the second liquid essentially colorless.

In a particularly preferred embodiment of the spirit-level vial of the invention, the first liquid is a colored aqueous liquid and the second liquid is an essentially colorless organic liquid, wherein said organic liquid has a higher density than said aqueous liquid.

The present invention is also directed to a spirit-level vial as defined hereinabove that further comprises visible calibrated markings on one or more surfaces of the transparent vessel.

The term "calibrated markings" is used herein to indicate that the positions of said markings on the transparent vessel have been either calculated or experimentally determined to be the positions corresponding to the rest positions occupied by the imaginary center point of the liquid globule when one of the axes of said vessel is tilted at certain, defined angular orientations of said vessel in relation to the horizontal plane.

In one preferred embodiment, the spirit-level vial comprises only one calibrated marking, wherein said marking corresponds to the rest position of the imaginary center point of the liquid globule when one of the axes of the vessel is orientated in the horizontal plane.

In another preferred embodiment of the invention, the spirit-level vial comprises a plurality of calibrated markings, each of which corresponds to a pre-determined angular orientation of one of the axes of the transparent vessel in relation to the horizontal plane.

In another aspect, the present invention also provides a spirit-level comprising:
a) one or more spirit-level vials as defined hereinabove and described in more detail hereinbelow;
b) a base element upon which said one or more spirit-level vials are mounted; and
c) one or more calibrated markings, wherein said calibrated markings are present on the surface of the transparent vessel of each of said one or more spirit-level vials and/or the surface of said base element adjacent to said transparent vessel.

The base element used to construct the abovementioned spirit-level may be constructed of any suitable material including wood, synthetic polymers, aluminum and other metals and alloys. The spirit-level vials may be attached to said base element by any convenient method known to the skilled artisan, including gluing, heat welding and affixing with straps or bands that are screwed, welded or riveted to said base element.

It is to be noted that the term "spirit-level" as used throughout this document is used in its conventional meaning to refer to a suitable device for determining whether a surface upon which said device rests is level. Likewise, the term "spirit-level vial" is used to refer to the liquid-containing vial or capsule that forms part of said "spirit-level". Despite the fact that the "spirit-levels" and "spirit-level vials" of the present invention are not limited to devices containing "spirit", (for example, alcohols or alcohol mixtures such as used in most earlier devices that are described by this term), these terms are retained for reasons of convention and convenience of description, and are to be understood as being interchangeable with the terms "level-determining device" and "level-determining device vials".

In another aspect, the present invention provides a method for producing a spirit-level vial, wherein said vial comprises a transparent vessel containing a globule of a first liquid suspended in a medium comprising a second liquid, wherein said first and second liquids have distinctly different densities, said method comprising introducing into said transparent vessel a suitable quantity of the high-density liquid, immersing the partially filled vessel in the low-density liquid, such that said low-density liquid fills the empty volume of said vessel, and closing said vessel.

All the above and other characteristics and advantages of the present invention will be further understood from the following illustrative and non-limiting examples of preferred embodiments thereof.

DETAILED DESCRIPTION OF PREFERRED EMBODIMENTS

Figure 1:
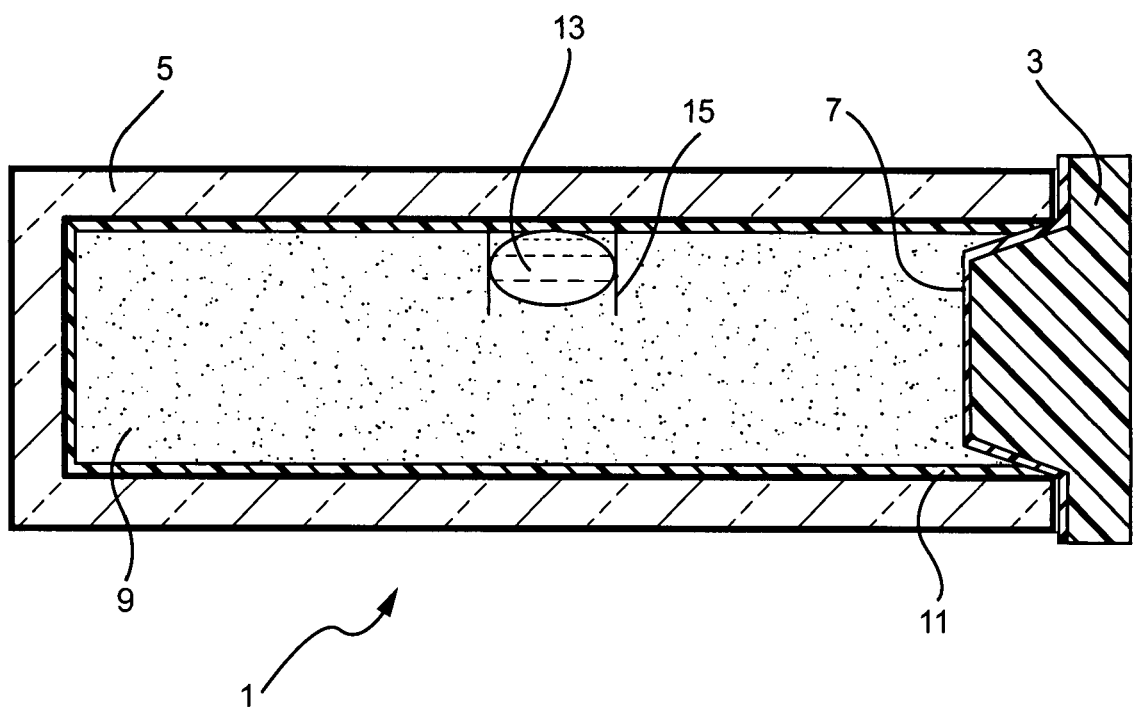
FIG. 1 shows an exemplary implementation of a spirit level vial.

The conventional spirit-level vials of the prior art are constructed such that they contain an air bubble suspended in a liquid medium. Clearly, said bubble is less dense than said medium, and as a result has a tendency to move towards the upper end of the vial when it is tilted away from the horizontal plane. For the purposes of the present discussion, this may be considered to be the conventional mode of operation for spirit-level vials. By analogy with the traditional air-bubble spirit-levels, the vials of the present invention may also be arranged such that they operate in the conventional mode, by means of using a first liquid (i.e., the liquid globule) that is less dense than the second liquid medium in which it is suspended. Alternatively, the spirit-level vial of the present invention may be so arranged as to operate in reverse mode, such that the liquid globule has a tendency to move towards the lower end of the vial when said vial is tilted away from the horizontal plane. It is to be emphasized that the present invention encompasses spirit-level vials of both operating modes within its scope.

A key feature of the design of the present invention is that the first liquid and the second liquid (as defined hereinabove) be mutually immiscible, in order to retain the unique two-phase globule-medium liquid composition. As mentioned hereinabove, this may be achieved by using a combination of either two immiscible organic liquids, or a combination of an organic liquid and an aqueous liquid, or a combination of an inorganic liquid and an aqueous liquid. Taking into account these various two-phase liquid-liquid combinations, as well as the two basic operating modes mentioned hereinabove, the following seven different specific embodiments of the spirit-level vial of the present invention may be identified, as summarized in Tables Ia and Ib:

TABLE Ia

Conventional mode (second liquid denser than first liquid)

| Embodiment: | First Liquid (globule) | Second Liquid (medium) |
|---|---|---|
| A | aqueous | organic |
| B | organic | aqueous |
| C | organic | organic |
| D | aqueous | inorganic |

Note:
the two organic liquids used in embodiment C are mutually immiscible.

TABLE Ib

Reverse mode (first liquid denser than second liquid)

| Embodiment: | First Liquid (globule) | Second Liquid (medium) |
|---|---|---|
| E | aqueous | organic |
| F | organic | aqueous |
| G | organic | organic |

Note:
the two organic liquids used in embodiment G are mutually immiscible.

Tables IIa, IIb and IIc present non-limiting lists of organic liquids, aqueous liquids and inorganic liquids that have been found to be suitable for working the present invention. Thus, by selecting a suitable combination of the liquids listed in Tables IIa, IIb and IIc, spirit-level vials according to embodiments A-G may be produced:

TABLE IIa

Examples of suitable organic liquids

Water-immiscible organic liquids (density greater than 1 g/cc):

1,6 dibromohexane
1,2,3 trichloropropane
1,5 dibromopentane
Carbon tetrachloride
1,4 dichlorobutane
1,1,1 trichloroethane
Dichloromethane
Trichloroethylene
Perfluorinated compounds: 3M ™ Fluorinert ™ liquids; perfluorodecaline or perfluoromethylcyclohexane manufactured by Fluorochem Ltd. (UK).
polyphenyl ethers (manufactured by Santovac under the names Santovac 5 polyphenyl ether, OS-124 polyphenyl ether and OS-138 polyphenyl ether)
Water-immiscible organic liquids (density lower than 1 g/cc):

Oils (soya oil, cannola oil, parrafin oil)
Alkanes $CH_3(CH_2)nCH_3$ ($3 < n < 18$), such as hexadecane (Fluka) or normal pentadecane (Merck)
Water-miscible organic liquids: (density lower than 1 g/cc):

Lower ($C_1$-$C_4$) alcohols, such as methanol and ethanol
Water-miscible organic liquids: (density greater than 1 g/cc):

Polyols (glycols, such as ethylene glycol)

TABLE IIb

Examples of suitable aqueous liquids

Water (and water/lower alcohol mixtures)
saline solution
glycol solution

TABLE IIc

Examples of suitable inorganic liquids polydimethylsiloxanes derivatives (Aldrich)

Many different dyes and other colored substances may be added to the aqueous liquids, the organic liquids, or both. Water-based food dyes have been found to be particularly suitable in this regard.

In order to reduce the freezing point of the above-listed aqueous liquids to below −20° C., methanol may also be added thereto in varying proportions. For example, it has been found that addition of methanol to water to a final concentration (by weight) of 5% leads to a reduction in the freezing point of the aqueous liquid by 3° C. Methanol concentrations of 20% (w/w) and 30% (w/w) were found to reduce the freezing point by 15° C. and 26° C., respectively. Thus different amounts of methanol may be added to the aqueous liquid in accordance with the desired working temperature range of the spirit-level vial.

A variety of other additives may also be added to one or both of the first and second liquids, in order to improve the efficiency, accuracy and reliability of the movement of the globule through the liquid medium, in response to changes in spatial orientation of the vial. In particular, these additives may be used to increase the speed of movement of the globule through the second fluid medium, on tilting of the vial. Such materials may be low viscosity organic materials such as petroleum ether or THF. These additives may also be lubricating materials, anti-foam additives and viscosity-reducing agents. In addition, appropriately-soluble salts may be added to the first liquid and/or the second liquid, in order to change the densities of one or both of said liquids, and to change the degree of immiscibility therebetween. It should be noted that according to the embodiment of the invention wherein the first liquid is an aqueous liquid and the second liquid is an organic liquid, wherein $\rho_2$ is greater than $\rho_1$, said organic liquid may be mixed with low viscosity organic liquids, such as, for example, heptane, hexane, n-octane, benzene and acetone, provided, of course, that the denisty of the resultant mixture is greater than $\rho_1$, in order to increase the velocity of the motion of the aqueous globule within the organic mixture.

Visibility-enhancing particles may be added to one or both of the first or second liquids in order to improve contrast between the globule and medium, and hence to facilitate reading of the spirit-level vial. Many different types of visibility-enhancing particles may be used in conjunction with the present invention, including: reflective hydrophobic polymer flakes or spheres, fluorescent particles (e.g., fluoroscein), and phosphorescent particles.

Several different materials have been tested for their suitability for use in the construction of the transparent vessels of the present invention, including Perspex, Polycarbonate, glass, polyethylene, polypropylene, polyestertera-phthalate (non-blown) and polyesterteraphthalate (blown). While all of these substances have been shown to have varying degrees of suitability for use in working the present invention, polypropylene is a particularly preferred material. One example of a particularly preferred transparent polypropylene that may be used for constructing the transparent vessel of the present invention is QT-73, which is manufactured by Carmel Olifenes Ltd., Haifa, Israel. A further example is polymethylpentene (PMP), a modified polypropylene. According to another preferred embodiment of the invention, the transparent vessel is made of glass, wherein the internal walls of said vessel are appropriately coated, for example, with a thin semi-transparent layer of teflon.

The spirit-level vial according to the present invention may be readily produced by introducing into a transparent vessel a suitable quantity of the high-density liquid, immersing the partially filled vessel in the low-density liquid, such that said low-density liquid fills the empty volume of said vessel, and closing (e.g., crimping) the vessel, thus preventing the entry of air into the vessel.

Typically, the volume of the glouble is about 6-20% of the total volume of the vessel. Thus, when a spirit-level vial according to embodiment A (as defined in Table Ia above) is intended, wherein a glouble of an aqueous liquid is suspended in an organic liquid having a density greater than 1.0 g/cc, the vial is prepared by introducing the high-density organic liquid into the transparent vessel in a quantity corresponding to about 80 to 94% of the volume of said vessel, immersing the partially filled vessel in the aqueous liquid, such that said aqueous liquid fills the empty volume of said vessel, and closing (e.g., crimping) the vessel.

It may be readily appreciated that according to the procedure described above, the transparent vessel must first be filled (partially) with the high-density liquid. Alternatively, the spirit-level vial may be produced by introducing into the transparent vessel the selected liquids in any desired order, following which the filled vessel is exposed to vacuum (typically in the range of 20 to 300 mmHg), in order to remove air present therein.

The following examples are provided for illustrative purposes and in order to more particularly explain and describe the present invention. The present invention, however, is not limited to the particular embodiments disclosed in these examples.

EXAMPLES

Example 1

Procedure for Preparing a Spirit-level Vial Containing an Aqueous Globule Suspended in an Organic Medium Embodiment A of Table Ia Transparent vessel made of: optically clear polymethylpentene
Medium: Organic liquid (1,2,3-trichloropropane)
Globule: Aqueous liquid (a mixture of water and methanol)

A 1 cc crimp cap type vial with a standard 11 mm fitting cap made of optically clear polymethylpentene (PMP X-22, manufactured by Mitsui Petrochemical Co., Tokyo, Japan) was used as the transparent vessel. The crimp cap was fitted with a teflon separator in order to provide complete compatibility with the organic solution. The vial was provided with an internal curvature radius of 10 inch. The vial was filled with 0.9 cc 1,2,3-trichloropropane (supplied by Sigma Chemicals Inc., Missouri)). The vial was then immersed upright beneath a colored solution comprising 10% methanol v/v %, a few grains of a water-soluble food dye (supplied by Rudo, Israel) and 90% water. The water/methanol/dye solution filled the remaining 0.1 cc empty volume of the vial and while the vial was submerged beneath the said solution, it was crimped shut with a suitable crimper. This process ensures that no air may leak into the two liquid phases and that a known quantity of colored water/methanol solution is introduced into the vial. Suitable markings to state the level state of the water/methanol bubble were etched on the external surface of the vial.

Example 2

A Spirit-level Vial Containing an Aqueous Globule Suspended in an Organic Medium Embodiment A of Table Ia Transparent vessel made of: optically clear glass
Medium: Organic liquid (1,2,3-trichloropropane)
Globule: Aqueous liquid (a mixture of water and methanol)

FIG. 1 shows an exemplary implementation where a 1 cc crimp cap type vial 1 with a standard 11 mm fitting cap 3 made of optically clear glass 5 was used as the transparent vessel. The glass vial 5 was provided with an internal curvature radius of 10 inch radius. The crimp cap 3 was fitted with a Teflon separator 7 in order to provide complete compatibility with the organic liquid 9 (The vial 5 was coated internally by a Teflon solution EGC 1700 11 manufactured by 3M and then dried and placed in a 70° C. oven for 20 minutes). The vial 5 was filled with 0.9 cc 1,2,3-trichloropropane 9 (supplied by Sigma). The vial 5 was then immersed upright beneath a colored solution comprising 10% methanol v/v%, a few grains of a water-soluable food dye (supplied by Rudo, Israel) and 90% water. The water/methanol/dye solution filled the remaining 0.1 cc empty volume of the vial 5 and while the vial 5 was submerged beneath said solution, it was crimped shut with a suitable crimper. Suitable markings 15 to state the level state of the water/methanol bubble 13 were etched on the external surface of the vial.

Example 3

A Spirit-level Vial Containing an Aqueous Globule Suspended in an Organic Medium Embodiment A of Table Ia Transparent vessel made of: optically clear polycarbonate
Medium: organic liquid (polyphenyl ether)
Globule: aqueous liquid (a mixture of water and methanol)

A 1 cc crimp cap type vial with a standard 11 mm fitting cap made of optically clear polycarbonate was used as the transparent vessel. The crimp cap was fitted with a teflon separator in order to provide complete compatibility with the organic solution. The vial was provided with an internal curvature radius of 10 inch radius. The vial was filled with 0.9 cc polyphenyl ether (santovac 5, manufactured by Santovac). The vial was then immersed upright beneath a colored solution comprising 10% methanol, a few grains of a water-soluble food dye (supplied by Rudo, Israel) and 90% water. The water/methanol/dye solution filled the remaining 0.1 cc empty volume of the vial and while the vial was submerged beneath the said solution, it was crimped shut with a suitable crimper. Suitable markings to state the level state of the water/methanol bubble were etched on the external surface of the vial.

Example 4

A Spirit-Level Vial Containing an Aqueous Globule Suspended in an Organic Medium Embodiment A of Table Ia Transparent vessel made of: optically clear polycarbobnate
Medium: Organic liquid (fluorinated compound)
Globule: Aqueous liquid (a mixture of water and methanol)

A 1 cc crimp cap type vial with a standard 11 mm fitting cap made of optically clear polycarbonate was used as the transparent vessel. The crimp cap was fitted with a teflon separator in order to provide complete compatibility with the organic solution. The vial was provided with an internal curvature radius of 10 inch. The vial was filled with Fluroinert™ liquid FC-70 manufactured by 3M. The vial was then immersed upright beneath a colored solution comprising 10% methanol v/v %, a few grains of a water-soluble food dye (supplied by Rudo, Israel) and 90% water. The water/methanol/dye solution filled the remaining 0.1 cc empty volume of the vial and while the vial was submerged beneath the said solution, it was crimped shut with a suitable crimper. Suitable markings to state the level state of the water/methanol bubble were etched on the external surface of the vial.

Example 5

A Spirit-Level Vial Containing an Organic Globule Suspended in an Aqueous Medium Embodiment B of Table Ia Transparent vessel made of: optically clear glass
Medium: Aqueous liquid (a mixture of water and methanol)
Globule: Organic liquid (alkane)

A 1 cc crimp cap type vial with a standard 11 mm fitting cap made of optically clear glass was used as the transparent vessel. The glass vial was provided with an internal curvature radius of 10 inch radius. The crimp cap was fitted with a teflon separator in order to provide complete compatibility with the organic solution. The vial was filled with 0.9 cc 80% (v/v %) water and 20% (v/v %) methanol solution. The vial was then immersed upright beneath hexadecane (Fluka). The alkane filled the remaining 0.1 cc empty volume of the vial and while the vial was submerged beneath the said oil, it was crimped shut with a suitable crimper. Suitable markings to state the level state of the organic bubble were etched on the external surface of the vial.

Example 6

A Spirit-Level Vial Containing an Organic Globule Suspended in an Aqueous Medium Embodiment B of Table Ia Transparent vessel made of: optically clear glass
Medium: Aqueous liquid (water+surfactant)
Globule: organic liquid (alkane)

A 1 cc crimp cap type vial with a standard 11 mm fitting cap made of optically clear glass was used as the transparent vessel. The glass vial was provided with an internal curvature of 10 inch radius. The crimp cap was fitted with a teflon separator in order to provide complete compatibility with the organic solution. The vial was filled with 0.9 cc 0.3%

Triton-X (manufactured by 3M) water solution. The vial was then immersed upright beneath normal pentadecane (Merck) and a few drops of dichlorofluorescein. The fluorescent organic liquid filled the remaining 0.1 cc empty volume of the vial and while the vial was submerged beneath the said oil, it was crimped shut with a suitable crimper. Suitable markings to state the level state of the organic bubble were etched on the external surface of the vial.

Example 7

A Spirit-level Vial Containing an Aqueous Globule Suspended in an Organic Medium Embodiment A of Table Ia Transparent vessel made of: optically clear polymethylpentene
Medium: organic liquid (1,5 dibromopentane)
Globule: water A 1 cc crimp cap type vial with a standard 11 mm fitting cap made of optically clear polymethylpentene (PMP X-22, manufactured by Mitsui Petrochemical Co., Tokyo, Japan) was used as the transparent vessel. The crimp cap was fitted with a teflon separator in order to provide complete compatibility with the organic solution. The vial was provided with an internal curvature radius of 10 inch. The vial was filled with 0.9 cc 1,5 dibromopentane (supplied by Sigma). The vial was then immersed upright beneath a colored solution comprising a few grains of a water-soluble food dye (supplied by Rudo, Israel) and water. The water/dye solution filled the remaining 0.1 cc empty volume of the vial and while the vial was submerged beneath the said solution, it was crimped shut with a suitable crimper. Suitable markings to state the level state of the aqueous bubble were etched on the external surface of the vial.

Example 8

A Spirit-Level Vial Containing an Aqueous Globule Suspended in an Organic Medium Embodiment A of Table Ia Transparent vessel made of: optically clear polymethylpentene
Medium: Organic liquid (A mixture of halogenated and non-halogenated liquids)
Globule: water A 1 cc crimp cap type vial with a standard 11 mm fitting cap made of optically clear polymethylpentene (PMP X-22, manufactured by Mitsui Petrochemical Co., Tokyo, Japan) was used as the transparent vessel. The crimp cap was fitted with a teflon separator in order to provide complete compatibility with the organic solution. The vial was provided with an internal curvature radius of 10 inch radius. The vial was filled with 0.9 cc solution of a blend of santovac OS-138 and fluoroinert™ FC-70 (50%:50% v/v).

The vial was then immersed upright beneath a colored solution comprising a few grains of a water-soluble food dye (supplied by Rudo, Israel) and water. The water/dye solution filled the remaining 0.1 cc empty volume of the vial and while the vial was submerged beneath the said solution, it was crimped shut with a suitable crimper. Suitable markings to state the level state of the aqueous bubble were etched on the external surface of the vial.

Example 9

A Spirit-level Vial Containing an Organic Globule Suspended in an Aqueous Medium Embodiment F of Table Ib Transparent vessel made of: optically clear polymethylpentene
Medium: aqueous liquid (water+methanol)
Globule: organic liquid (1,2,3-trichloropropane)

A 1 cc crimp cap type vial with a standard 11 mm fitting cap made of optically clear polymethylpentene (PMP X-22, manufactured by Mitsui Petrochemical Co., Tokyo, Japan) was used as the transparent vessel. The crimp cap was fitted with a teflon separator in order to provide complete compatibility with the organic solution. The vial was provided with an internal curvature radius of 10 inch. The vial was filled with 0.1 cc 1,2,3-trichloropropane (supplied by sigma). The vial was then immersed upright beneath a colored solution comprising 10% methanol v/v %, a few grains of a water-soluble food dye (supplied by Rudo, Israel) and 90% water. The water/methanol/dye solution filled the remaining 0.9 cc empty volume of the vial and while the vial was submerged beneath the said solution, it was crimped shut with a suitable crimper. Suitable markings to state the level state of the organic bubble were etched on the external surface of the vial.

While specific embodiments of the invention have been described for the purpose of illustration, it will be understood that the invention may be carried out in practice by skilled persons with many modifications, variations and adaptations, without departing from its spirit or exceeding the scope of the claims. For example, the spirit-level vial according to the present invention may be also produced by introducing into a transparent vessel suitable quantities of the first and second liquids, sealing the vessel by means of a suitable teflon film to prevent air entry, and subsequently closing (e.g., crimping) the vessel.

The invention claimed is:

1. A spirit-level vial comprising a transparent vessel containing a globule of a first liquid suspended in a medium comprising a second liquid, wherein said transparent vessel is essentially completely filled by said medium, and wherein said globule is capable of moving freely through said medium in response to any changes in the spatial orientation of said transparent vessel, wherein said second liquid has a higher density than said first liquid, said first liquid being an aqueous liquid and said second liquid being an organic liquid.

2. The spirit-level vial according to claim 1, wherein the aqueous liquid comprises a mixture of water, alcohol and a colored dye.

3. The spirit-level vial according to claim 1, wherein the organic liquid comprises one or more compounds selected from the group consisting of organohalogen compounds polyphenyl ethers.

4. The spirit-level vial according to claim 3, wherein the organohalogen compound is selected from the group consisting of halogenated $C_1$-$C_{10}$ straight or branched alkanes, halogenated $C_3$-$C_{10}$ cycloalkanes, halogenated straight or branched $C_2$-$C_{10}$ alkenes, halogenated $C_3$-$C_{10}$ cycloalkenes, halogenated straight or branched $C_2$-$C_{10}$ alkynes.

5. The spirit-level vial according to claim 3, wherein the organohalogen compound is a fluorinated or perfluorinated aliphatic or alicyclic compound.

6. The spirit-level vial according to claim 1, wherein the first andlor second liquids further comprises visibility-enhancing particles.

7. The spirit-level vial according to claim 6, wherein the visibility-enhancing particles are fluorescent particles.

8. The spirit-level vial according to claim 1, wherein both of the two liquids are strongly colored, and wherein the two liquids are each colored with a mutually contrasting color.

9. The spirit-level vial according to claim 1, wherein one of the two liquids is strongly colored, the other liquid being essentially colorless.

10. The spirit-level vial according to claim 1, wherein the transparent vessel is constructed of optically clear material selected from the group consisting of polypropylene, polymethylpentene, perspex, polycarbonate and glass.

11. The spirit-level vial according to claim 1, wherein the internal walls of the vessel are provided with a suitable coating to increase compatibility with the liquids present therein.

12. The spirit-level vial according to claim 11, wherein the internal walls are coated with a thin layer of a fluor-based polymer.

13. A spirit-level comprising:
   a) one or more spirit-level vials according to claim 1;
   b) a base element upon which said one or more spirit-level vials are mounted; and
   c) one or more calibrated markings, wherein said calibrated markings are present on the surface of the transparent vessel of each of said one or more spirit-level vials and/or the surface of said base element adjacent to said transparent vessel.

14. A method for producing a spirit-level vial according to claim 1, wherein said vial comprises the transparent vessel containing the globule of the first liquid suspended in the medium comprising the second liquid, wherein said liquids have distinctly different densities, said method comprising:
   introducing into said transparent vessel a suitable quantity of the high-density liquid;
   immersing the partially filled vessel in the low-density liquid, such that said low-density liquid fills the empty volume of said vessels; and
   closing said vessel.

15. A method for producing a spirit-level vial according to claim 1, wherein said vial comprises the transparent vessel containing the globule of the first liquid suspended in the medium comprising the second liquid, wherein said liquids have distinctly different densities, said method comprising:
   introducing said liquids into the transparent vessel;
   exposing said vessel to vacuum to remove air present therein; and
   closing the vessel.

* * * * *